UNITED STATES PATENT OFFICE.

JOHANN FRIEDRICH MEYER, JR., AND KARL WIMMER, OF BREMEN, GERMANY.

TEA PRODUCT AND PROCESS OF MAKING SAME.

No. 897,764.      Specification of Letters Patent.      Patented Sept. 1, 1908.

Application filed October 1, 1906. Serial No. 336,973.

*To all whom it may concern:*

Be it known that we, JOHANN FRIEDRICH MEYER, Jr., and KARL WIMMER, subjects of the German Emperor, residing at Bremen, Germany, have invented certain new and useful Improvements Relating to Tea and to the Preparation or Treatment of the Same, of which the following is a specification.

This invention relates to a tea product and method of manufacturing the same and the object thereof is to provide a tea product free of theine and with the aromatic constituents of the tea unimpaired to any material extent.

Attempts have been made for relieving tea leaves of theine, but it has been demonstrated that the volatile solvents used for such purpose dissolve all aromatic constituents of the tea but not the theine, the reason being that the tea leaves do not contain free theine but compounds of theine, which will not dissolve in volatile solvents such as chloroform and benzene. Under such conditions the theine must therefore be liberated before it can be caused to enter into the solution, but in order to retain the value of tea as a beverage, it is necessary to restore to the tea leaves the aromatic substances extracted therefrom during the removal of the theine and for such purpose and in accordance with this invention an extract is first prepared from the tea leaves by means of a volatile solvent. In this connection it may be stated that the same solvent may be employed which has served for the extraction of the aromatic substances, or a different solvent may be used. When the tea has been relieved of theine the solution containing the aromatic constituents is again added to the tea leaves by the impregnation of the leaves with such constituents, after which the solvent is distilled off.

As more clearly setting forth the method of procedure and the product obtained reference is had to the following specific example of the process. 10 kilograms of tea are treated with a petroleum spirit, by way of example benzol, in a suitable apparatus. This will cause the removal of the aromatic constituents from the tea, but no theine is dissolved, the aromatic constituents being the aromatic oils and tannin. The solvent containing the aromatic oils and tannin is then drawn off after the extraction has been completed. The tea is then subjected to steam, after which step ammoniac gas is supplied to the apparatus at one end and until its odor becomes perceptible at the opposite end of the apparatus. By subjecting the tea to the ammoniac gas the salts of theine are decomposed. The tea is then subjected to a volatile solvent such as chloroform whereby the theine enters into solution. When this step has been completed, the solvent with the theine is drawn off, the tea is then dried by indirect heat, after which the petroleum spirit containing the aromatic constituents in solution is added to the tea whereby the latter is thoroughly impregnated; the petroleum spirit is then distilled off while continually stirring the tea, the resulting product being that the tea will contain the aromatic constituents unimpaired to any material extent, but the tea will be free of theine.

What we claim is:—

1. In a process for the preparation of tea free from theine, subjecting the tea to a volatile solvent whereby the aromatic bodies are extracted from the tea, then removing the solvent containing the aromatic bodies, then decomposing the salts of theine contained in the tea, then subjecting the tea to a volatile solvent whereby the theine is extracted, then withdrawing the solvent containing the theine, then impregnating the tea with the solvent containing the aromatic constituents, and then distilling off the last mentioned solvent.

2. In a process for preparing tea free from theine, subject the tea to a petroleum spirit whereby the aromatic constituents are extracted, then removing said petroleum spirit, then subjecting the tea to steam and ammonia to decompose the salts of theine, then extracting the theine by subjecting the tea to chloroform, then withdrawing the chloroform containing the theine, then drying the tea, then adding the petroleum spirit containing the aromatic constituents and thoroughly impregnating the tea with said constituents, and then finally distilling off the petroleum spirit.

3. As a new article of manufacture, tea leaves originally containing theine, freed therefrom and having their remaining aromatic constituents substantially unimpaired.

In testimony whereof we have set our hands hereunto in the presence of two subscribing witnesses.

JOHANN FRIEDRICH MEYER, JR.
   KARL WIMMER.

Witnesses:
 ERNEST H. L. MUMMENHOFF,
 OTTO W. HELLMRICH.